United States Patent [19]

Momose et al.

[11] Patent Number: 5,005,349
[45] Date of Patent: Apr. 9, 1991

[54] STIRLING ENGINE

[75] Inventors: Yutaka Momose, Anjo; Tetsumi Watanabe, Okazaki; Akira Yamaguro, Chiryu, all of Japan

[73] Assignee: Aisin Seiki Kabushiki Kaisha, Kariya, Japan

[21] Appl. No.: 413,741

[22] Filed: Sep. 28, 1989

[30] Foreign Application Priority Data

Sep. 29, 1988 [JP] Japan .............................. 63-242415

[51] Int. Cl.$^5$ .............................................. F02G 1/04
[52] U.S. Cl. ..................................................... 60/517
[58] Field of Search ......................................... 60/517

[56] References Cited

U.S. PATENT DOCUMENTS 4,055,952 11/1977 Johansson et al. .................... 60/517

FOREIGN PATENT DOCUMENTS 55-23351 2/1980 Japan ..................................... 60/517

Primary Examiner—Allen M. Ostrager
Attorney, Agent, or Firm—Burns, Doane, Swecker & Mathis

[57] ABSTRACT

A Stirling engine is provided in which the burner has an annular shape and is disposed in an outside lower portion of the heater. The burner has a plurality of fuel delivery holes and a plurality of air supplying holes which open through an inner circumferential surface of the burner. The arrangement permits the Stirling engine to use a fuel line under a low pressure and to be easily used as a power source of a compressor for an air-conditioning and heating device for domestic use. Also, the arrangement permits the Stirling engine to be constructed without a fuel/air mixing device and to be used with a smaller blower. Furthermore, the arrangement permits the burner to be made from a variety of material, thereby reducing the manufacturing cost.

8 Claims, 14 Drawing Sheets

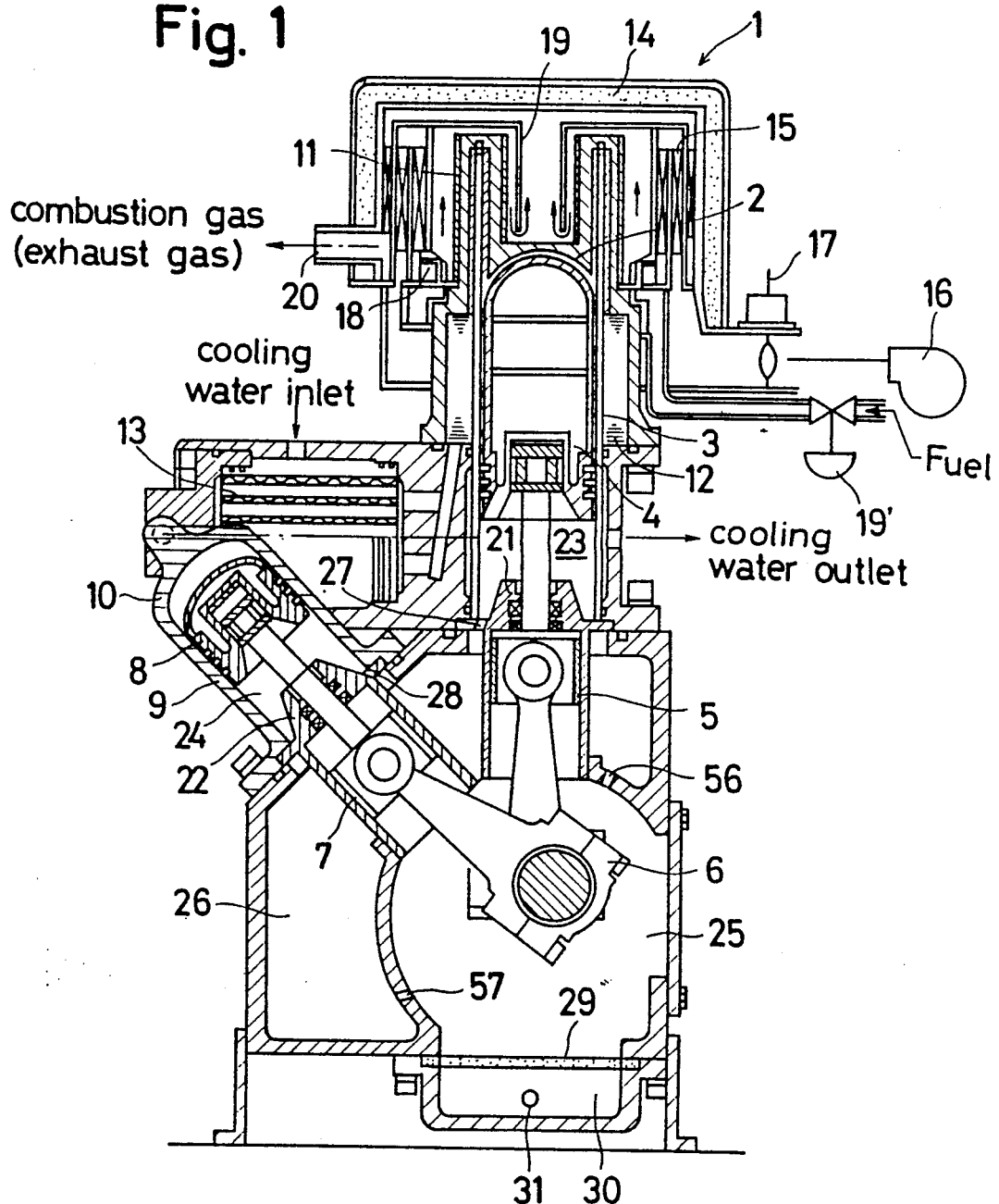

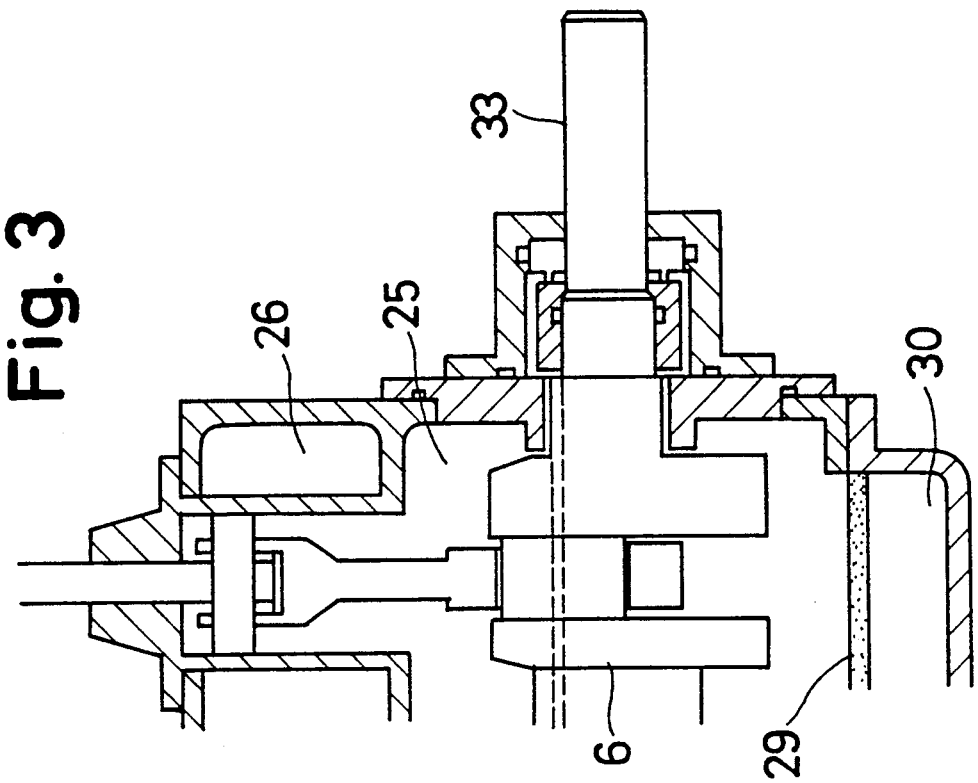
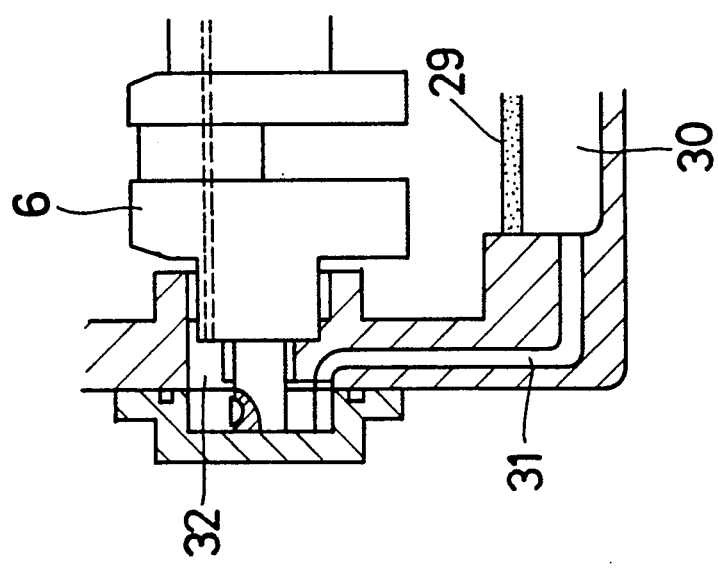

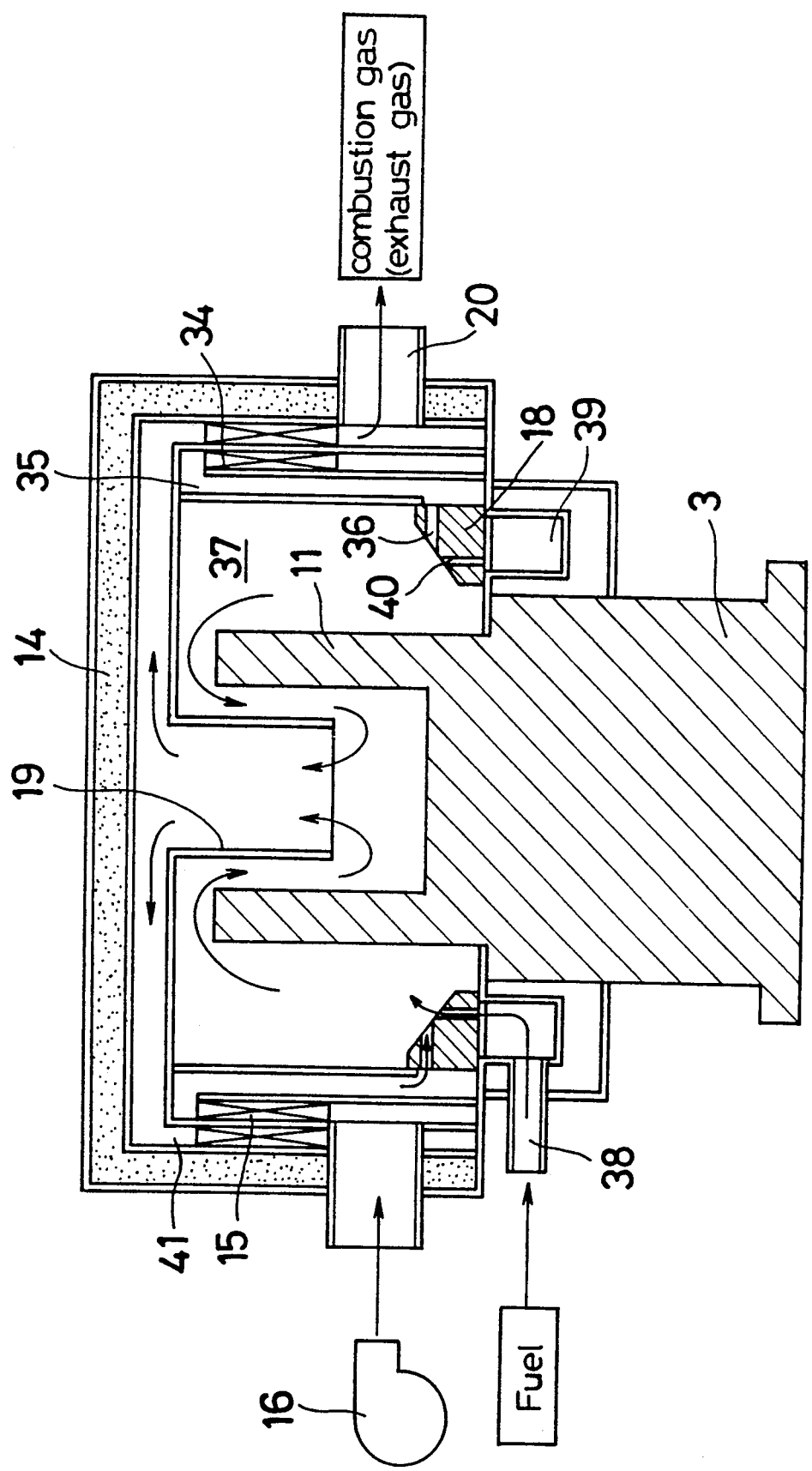

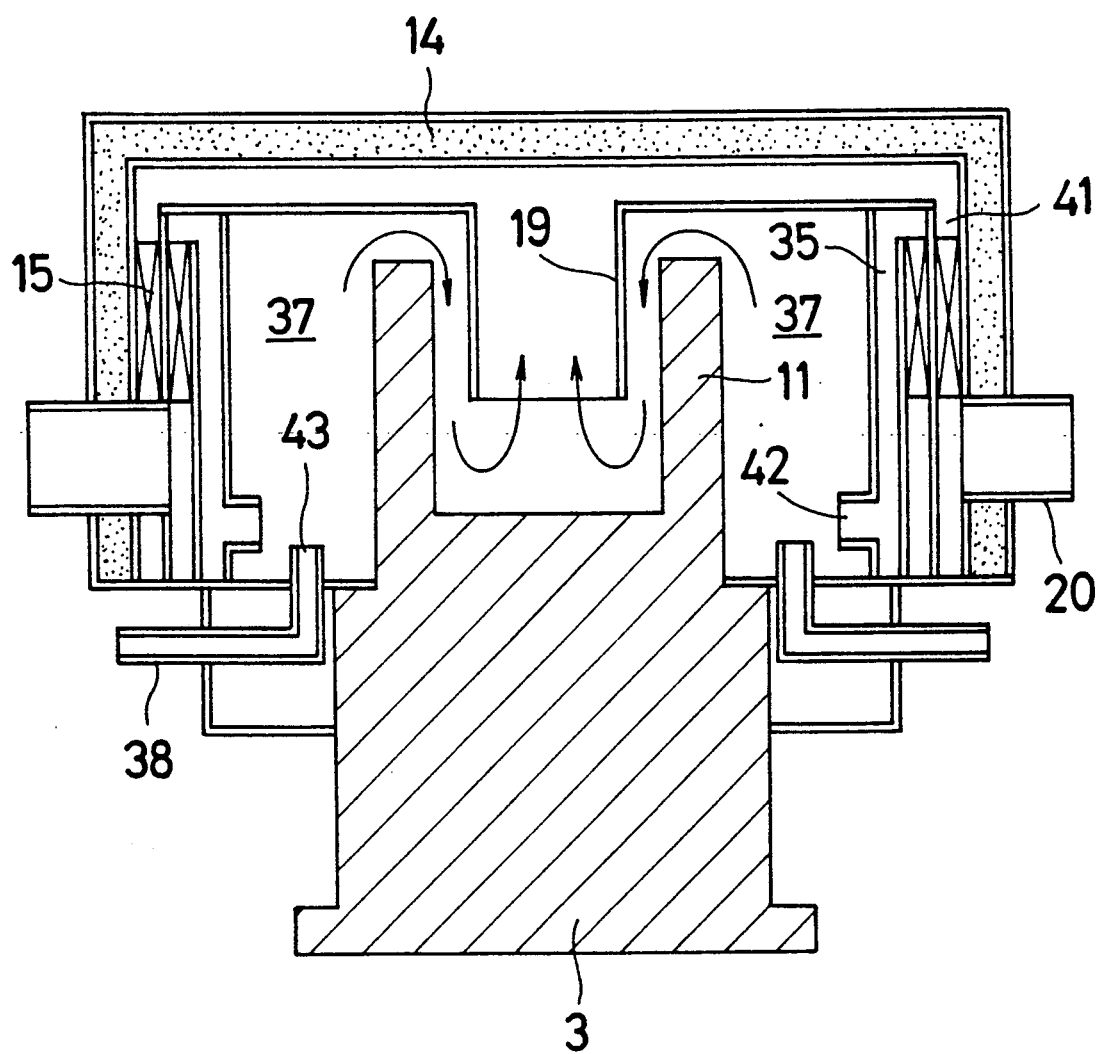

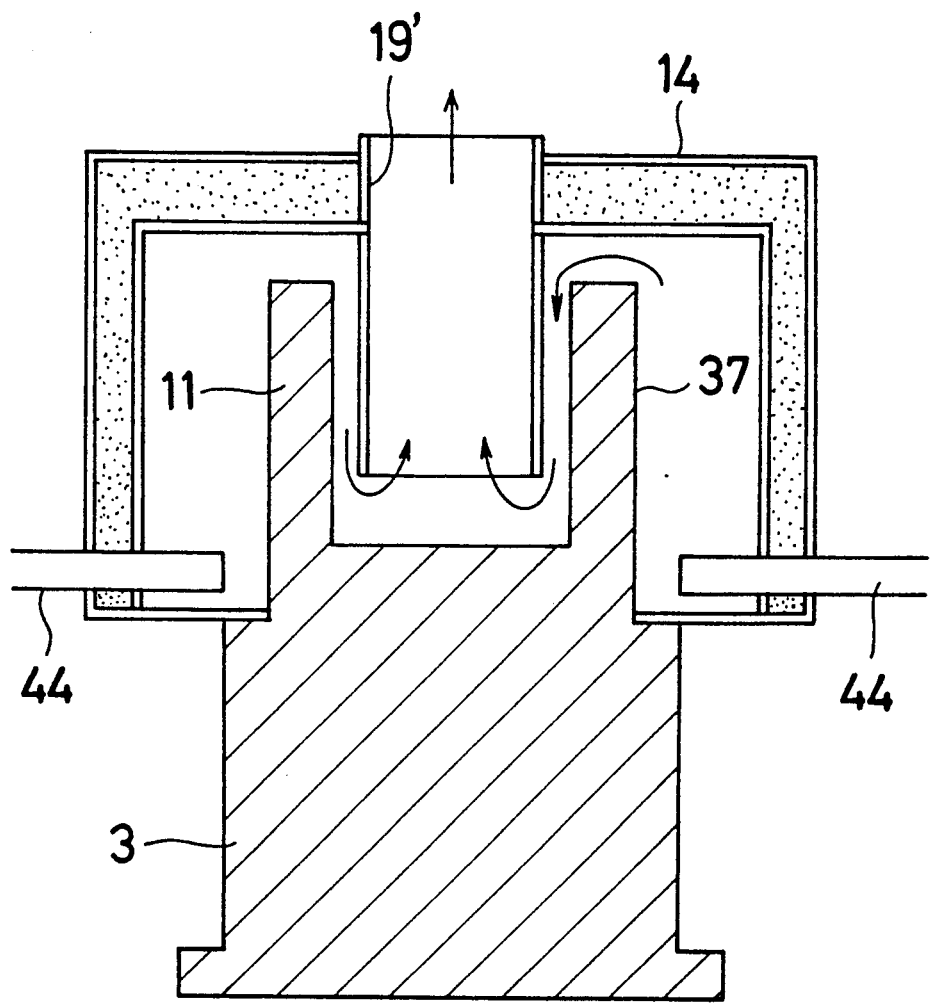

STIRLING ENGINE

BACKGROUND OF THE INVENTION

1. Field of the Invention

The present invention relates to a Stirling engine, and more particularly to a burner of a Stirling engine suitable for air-conditioning, heating and generation of electric power.

2. Description of the Prior Art

A conventional Stirling engine has a reversible cycle which includes two isothermal changes and two equivalent changes. Namely, the Stirling engine has a cycle which cold (isothermally) compresses an operational gas such as helium enclosed therein with external cooling (generally the operational gas is heated by the combustion heat supplied to a heater). In the Stirling engine having the cycle of this sort, the waste heat left in the cooling water of the cooler is larger than 50% of the input heat supplied to the heater. By the use of the Stirling engine, it is possible to improve the efficiency of the use of the energy due to using the waste heat for heating and suctioning of hot water. Further, the heat efficiency is high, hazards to the public minimal and it is able to use the variety fuels. As a result, the Stirling engine is suitable as a power source of a compressor for an air-conditioning and heating device.

In the Stirling engine, the efficiency of the heat transfer between the heat and the combustion gas largely influences the efficiency of the Stirling engine.

In the conventional Stirling engine, the burner is disposed in the center of the combustion chamber and the heater tubes are positioned at the outer circumferential portion of the combustion chamber, for example, as shown in U.S. Pat. No. 4,522,030. In this burner, however, since the burner is disposed in the center and upper side of the combustion chamber, it is not possible to enlarge the opening area of the nozzle of a burner without spoiling the stabilized combustion. Therefore, it is not possible to burn the fuel under a low pressure condition. Accordingly, it is impossible to use the burner as a power source of the compressor for an air-conditioning and heating device for domestic use.

SUMMARY OF THE INVENTION

It is, therefore, an object of the present invention to provide an improved Stirling engine wherein a burner is used with a fuel line under low pressure.

It is another object of the present invention to provide an improved Stirling engine wherein the opening area of a nozzle of the burner is enlarged without spoiling stabilized combustion.

It is a further object of the present invention to provide an improved Stirling engine which can be used as a power source of a compressor of an air-conditioning and heating device for domestic use.

It is a further object of the present invention to provide an improved Stirling engine which includes an expansion chamber defined in an expansion cylinder by an expansion piston, a compression chamber defined in a compression cylinder by a compression piston and communicating with the compression chamber via a heater, a regenerator and a cooler. The heater is circularly disposed in the center of a combustion chamber, and a burner having a ring-shape is disposed in the outside of the lower portion of the regenerator side of the heater. The burner includes a plurality of fuel delivery holes and a plurality of air holes that open through an inner surface or the heater.

BRIEF DESCRIPTION OF THE DRAWINGS

Additional objects and advantages of the present invention will become more apparent from the following detailed description of preferred embodiments thereof when considered with reference to the attached drawings, in which:

FIG. 1 is a sectional view of an embodiment of a Stirling engine in accordance with the present invention;

FIG. 2 is a partial sectional view of an oil pump of an embodiment of a Stirling engine in accordance with the present invention;

FIG. 3 is a sectional view of an output shaft of an embodiment of a Stirling engine in accordance with the present invention;

FIG. 4 is a sectional view of a combustion chamber of an embodiment of a Stirling engine in accordance with the present invention;

FIG. 5 is a sectional view of another embodiment of the heater.

FIG. 6 is a sectional view of a further embodiment of the heater.

DESCRIPTION OF THE PREFERRED EMBODIMENT

Figure 7:
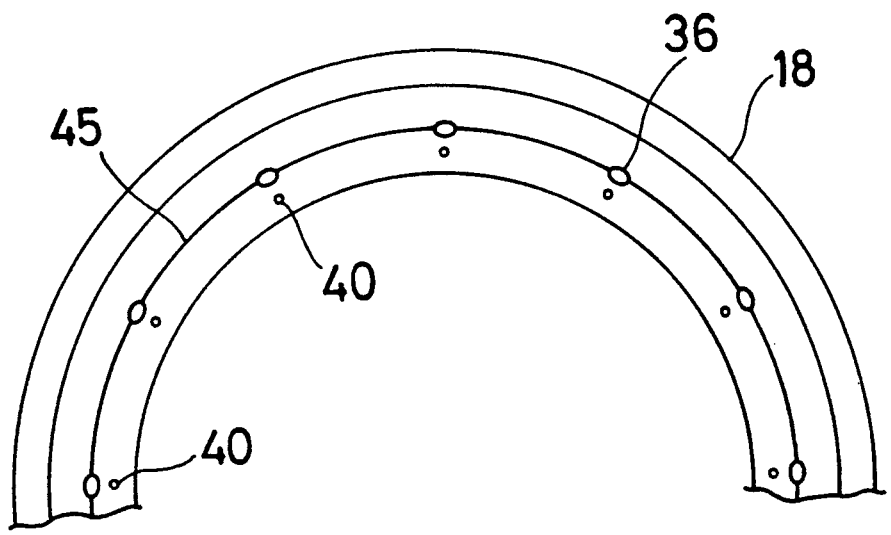
FIG. 7 is a partial plane view of the burner shown in FIG. 1.

A Stirling engine constituted in accordance with the embodiments of the present invention will be described with reference of the drawings.

Referring to FIG. 1, there is schematically illustrated a Stirling engine which includes a expansion cylinder 3 and a compression cylinder 9 which is inclined 45 degree with regard to the expansion cylinder 3. An expansion piston 4 is air tightly and slidably fitted into the expansion cylinder 3 to define an expansion chamber 2, and is connected to a crankshaft 6 via a cross head 5. A compression piston 8 is air tightly and slidably fitted into the compression cylinder 9 to define a compression chamber 10, and is connected to the crankshaft 6 via a cross head 7. The expansion chamber 2 is communicated with the compression chamber 10 via a heater 11, a regenerator 12 and a cooler 13, and the operational gas, such as helium, is enclosed in an operational sealing area leading from the expansion chamber 2 to the compression chamber 10. The capacity of the expansion chamber 2 changes in response to rotation of the crankshaft 6, and the capacity of the compression chamber 10 changes with a phase difference of 45 degree in response to the rotation of the crankshaft 6.

A preheater 15 of air for combustion is disposed along the inner side of an isothermal outer sleeve 14. The air for combustion is supplied from a blower 16 and is introduced to the preheater 15 after the flow quantity is adjusted by a throttle valve 17. In FIG. 1, the air introduced to the preheater 15 goes through a labyrinth path while being preheated and introduced to a annular ceramic burner 18. A fuel is supplied to the burner 18 via a control valve 19'. The air and fuel are then burned by the burner 18. The combustion gas, having a high temperature, flows to an exhaust duct 20 while moving up and down the circumference of the heater 11 in the direction shown in FIG. 1. At this time, heat-exchange occurs between the combustion gas and the operational gas. Afterward, the combustion gas flows along the inner circumference of the outer sleeve 14 and is discharged from an outlet port 20.

The operational gas which is heated by the heater 11 is isothermally expanded in the expansion chamber 2. On the other hand, the operational gas from the regenerator 12 is cooled by the cooler 13 using a cooling water and is isothermally compressed in the compression chamber 10.

Between each piston 4, 8 and each middle member 21, 22 supporting each piston rod, each middle chamber 23, 24 is formed, respectively. The pressures inside these middle chambers 23, 24 are changed in response to the reciprocating movement of each piston 4, 8, respectively, and a resistance is thereby given to the movement of each piston 4, 8. Therefore, in this embodiment, a buffer chamber 26 communicating with both middle chambers 23, 24 via passages 24, 28 is formed in the crank chamber 25 and the changing of pressure in the middle chambers 23, 24 is prevented.

In the crank chamber 25, an oil chamber 30 is defined by a oil filter 29. The oil chamber 30 is in communication with an oil pump 32 via an oil passage 31 and the oil pump 32 supplies the oil from the oil chamber 30 to the parts which require lubrication as shown by FIG. 2 and FIG. 3.

The crank shaft 6 outputs the rotational output in response to the reciprocating movement of the pistons 4, 8 and the rotational output is transmitted via an output shaft 33.

Referring to FIG. 4, the preheater 15, which is disposed along the inner wall of the outer sleeve 14 which is covered by a heat insulating material, includes a heat-exchanger 34 between the air for the combustion and the exhaust gas, an air passage 35 communicating with the burner 18 and a passage 41 for the exhaust gas. The air for the combustion which is introduced to the air passage 35 is supplied to the combustion chamber 37 via a hole or passage 36 of the burner 18. The fuel which is introduced to a delivery pipe 39 via a fuel passage 38 is introduced to the combustion chamber 37 via a hole or passage 40 of the burner 18. The fuel becomes mixed with air from the hole 36 and burns outside of the heater 11. The high temperature combustion gas follows the arrow, namely, the combustion gas flows from outside of heater 11 to the inside of the heater 11. As a result, the heat-exchange between the combustion gas and the operational gas is efficiently done. The combustion gas flows from the center duct 19 which extends into the center area of the heater 11, to the outside of the combustion chamber 37 and is introduced to the passage of the preheater 15. Afterward, the combustion gas is discharged from the outlet port 20 after exchanging heat with the air for the combustion.

FIG. 5 shows another embodiment of the heater. In FIG. 4, the fuel and the air for the combustion are supplied to the combustion chamber via the ceramic burner 18. On the other hand, in FIG. 5, a plurality of air supplying hole or passages 42 are formed at lower side of the air passage 35 so as to communicate with the combustion chamber 37, and a plurality of fuel delivery holes or passage 43 are provided which have a center line which is at substantially right angles to the center line of the air supplying hole 42. The fuel and air are delivered to the combustion chamber 37 via holes 42, 43, respectively. It is desirable that the air supplying holes 42 are formed toward a tangent direction of the outer sleeve 14. In this embodiment, the flow of the combustion gas about the heater 11 and the heat-exchange between the heater 11 (operational gas) and the combustion gas is the same in the embodiment of FIG. 4.

FIG. 6 shows further embodiment of the heater. In FIG. 6, the preheater 15 is not disposed at the outer circumference of the combustion chamber 37 and the center duct 19 extends to the outside of the outer sleeve 14 via a center opening of the outer sleeve 14. The mixed air is delivered to the combustion chamber 37 via plural pipes 44, and is burned therein. The flow of the combustion gas about the heater 11 and the heat-exchange between the heater 11 (operational gas) and the combustion gas is the same as the embodiment of FIG. 4 and FIG. 5.

The burner 18 shown in FIG. 4 is now described. The burner 18, as further shown in FIGS. 7-9, has an annular shape and a two piece structure. A part shown by the numeral 45 is a combination face of an upper part 46 and a lower part 47. In the combination face 45 of the upper part 46 and the lower part 47, the air holes 36 are formed substantially in parallel by the parts 46, 47, and the fuel delivery holes 40 are formed in the lower part 47. The burner 18 is provided with a tapered face 48 at its upperside of the inner circumferential surface, whereby the mixture of the fuel and the air is substantially dense.

Figure 10:
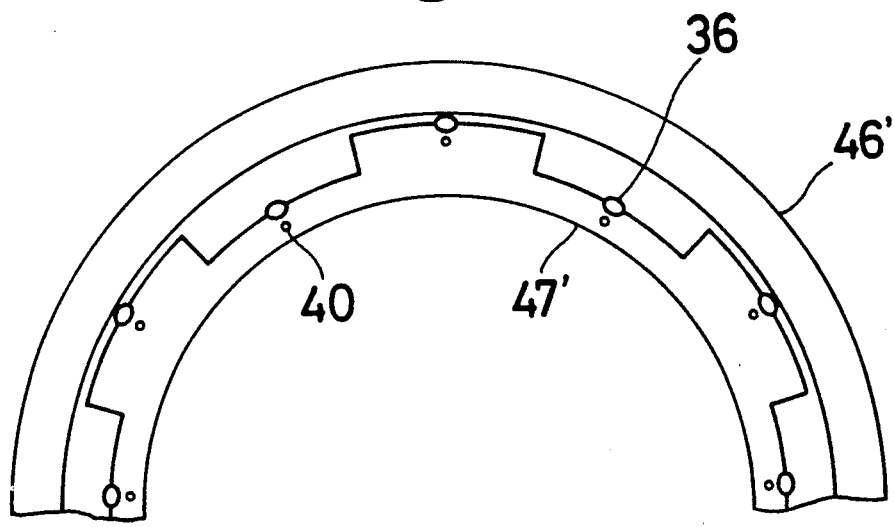
FIG. 10 is a partial plane view of a burner of another embodiment of a Stirling engine in accordance with the present invention.
Figure 11:
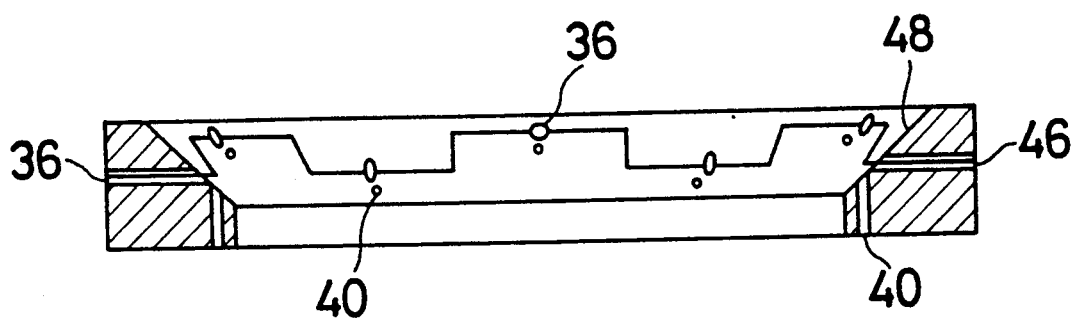
FIG. 11 is a longitudinally sectional view of the burner shown by FIG. 10.
Figure 12:
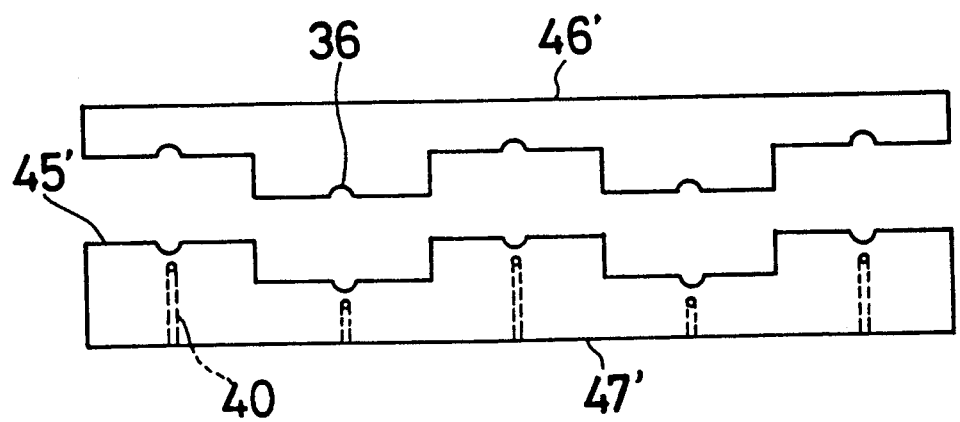
FIG. 12 is a front view of the burner shown in FIG. 10.

The embodiment shown by FIGS. 10-12 has a combination face 45' between an upper part 46' and a lower part 47' which are formed in step-like shapes. The air holes 36 are formed between the upper part 46' and the lower part 47' as offset by the stepped shape of the parts 46', 47' Both holes 36, 40 have center lines which intersect at substantially right angles, respectively.

Figure 8:
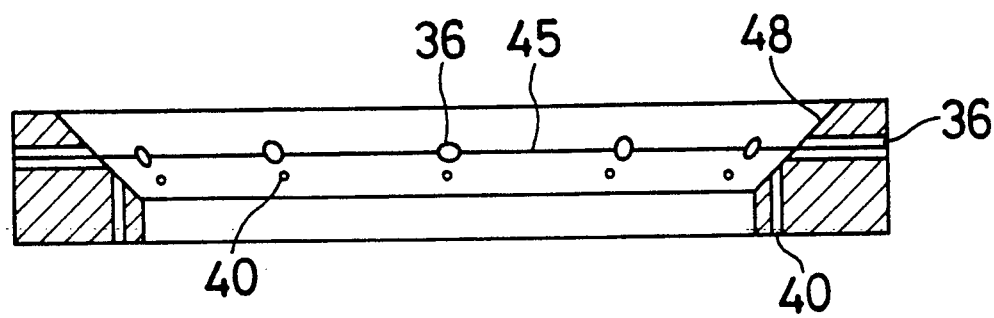
FIG. 8 is a longitudinally sectional view of the burner shown in FIG. 1.
Figure 9:
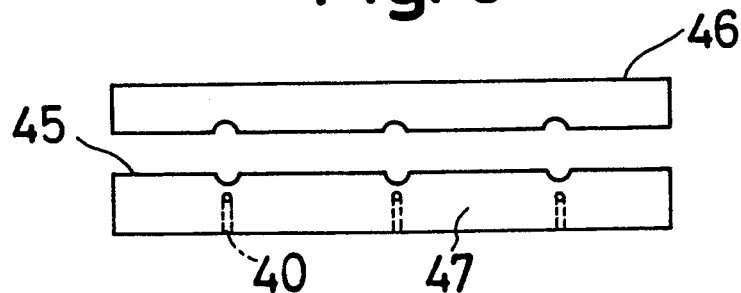
FIG. 9 is a front view of the burner shown in FIG. 1.
Figure 13:
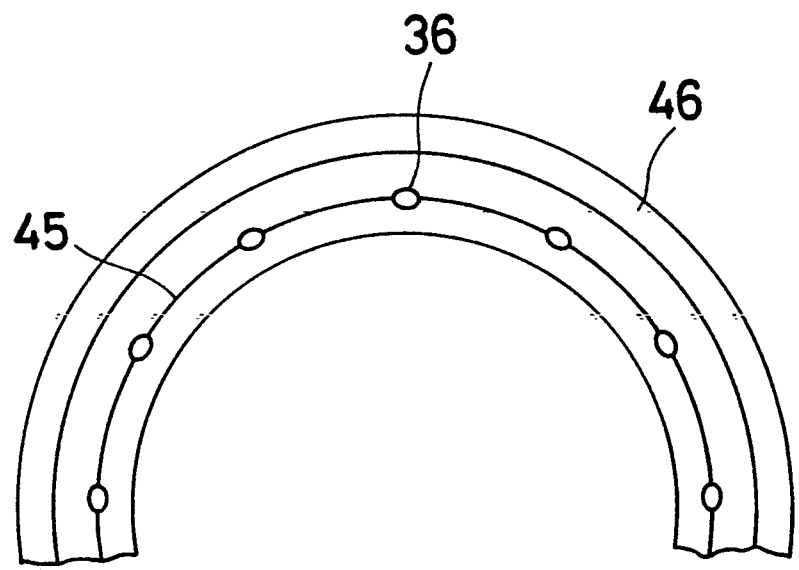
FIG. 13 is a partial plane view of a burner of another embodiment of a Stirling engine in accordance with the present invention.
Figure 14:
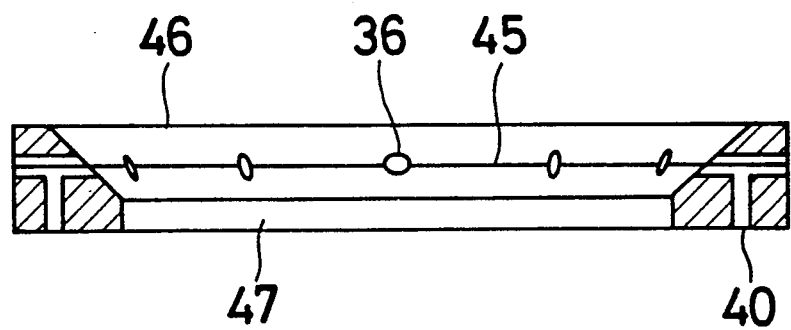
FIG. 14 is a sectional view of the burner shown in FIG. 13.

The embodiment shown by FIGS. 13 and 14 is substantially the same as the embodiment shown by FIGS. 6-8. In the embodiment shown by FIGS. 13 and 14, however, the fuel delivery holes 40 are connected with the air holes 36, whereby the fuel is pre-mixed in the air.

Figure 15:
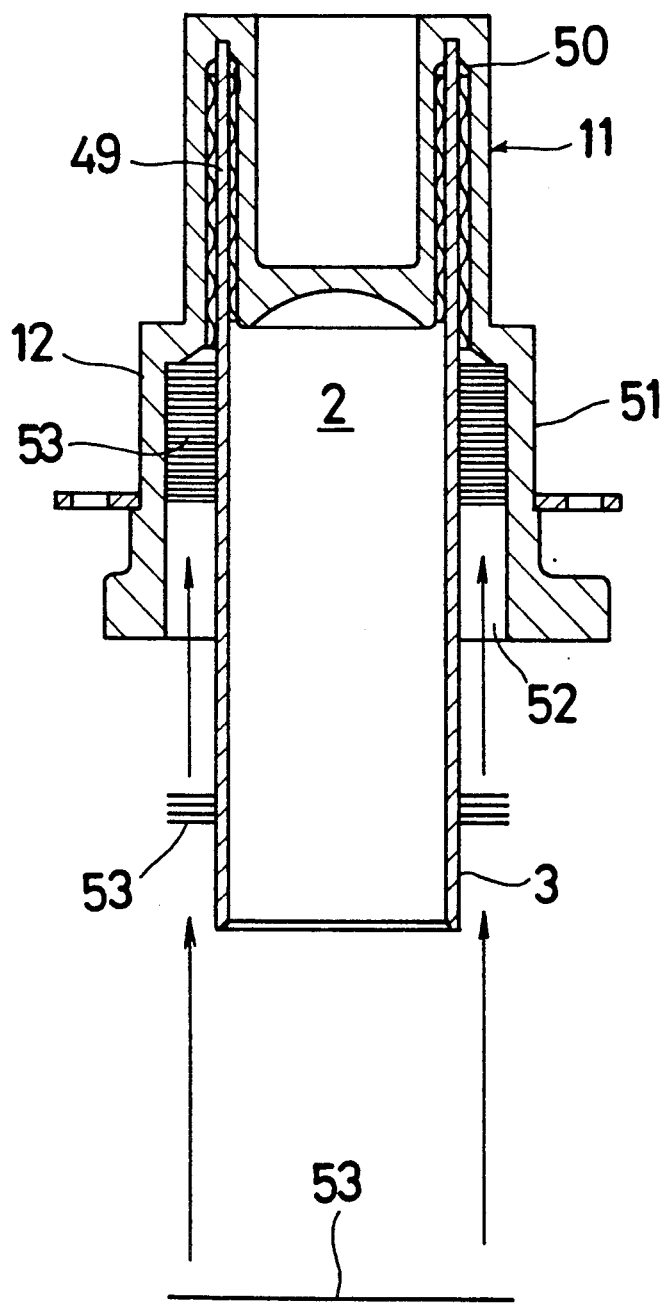
FIG. 15 is a front view of the burner shown by FIG. 13.

In FIG. 15, the expansion cylinder 3 includes an extension part 49 which extends from the expansion chamber 2 to an upper side of the heater 11, and the heater 11 is disposed so as to form an annular area 50 about the extension part 49. The heater 11 has a cylindrical shape and the annular area 50 is formed as its cylindrical wall. In the annular area 50, the extension part 49 is loosely fitted therein, and as a result, an annular passage which communicates with the regenerator 12 and an annular passage which communicates with the expansion chamber 2 are defined in the annular area 50. Thereby, the operational gas which is in the annular area 50 receives heat from both the inner and outer circumferential surfaces of the heater 11. Both annular passages are in communication with each other.

The regenerator 12, in communication with the heater 11, includes annular metal mesh members 53 which fill in annular area 52 which is formed when a cylindrical member 51 is disposed around the expansion cylinder 3. The metal mesh members 53 are made of stainless steel and have a line diameter of 50-200 μm. The metal mesh members 53 are positioned in the annular area 52 so as to occupy about half of the area capacity of the annular area 52.

Figure 16A:
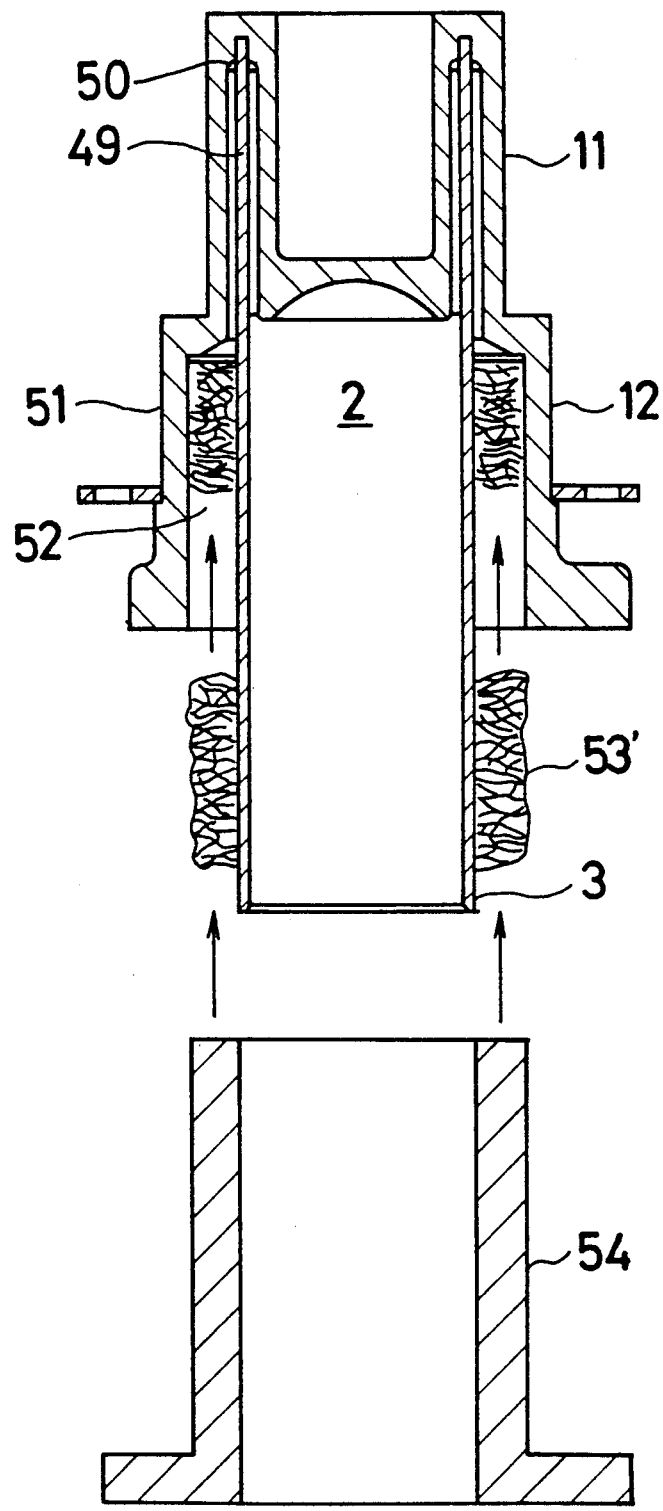
FIG. 16a and FIG. 16b are sectional views of the regenerators of other embodiments of a Stirling engine in accordance with the present invention.

The embodiment shown in FIG. 16a is an embodiment in which a metal fiber 53' fills the annular area 52. The metal fiber 53' is made of stainless steel and has a line diameter of 50-200 μm. The metal fiber 53' is positioned in the annular area 52 so as to occupy substantially 50% of the area capacity of the annular area 52 and is inserted therein by a mandril 54.

Figure 16B:
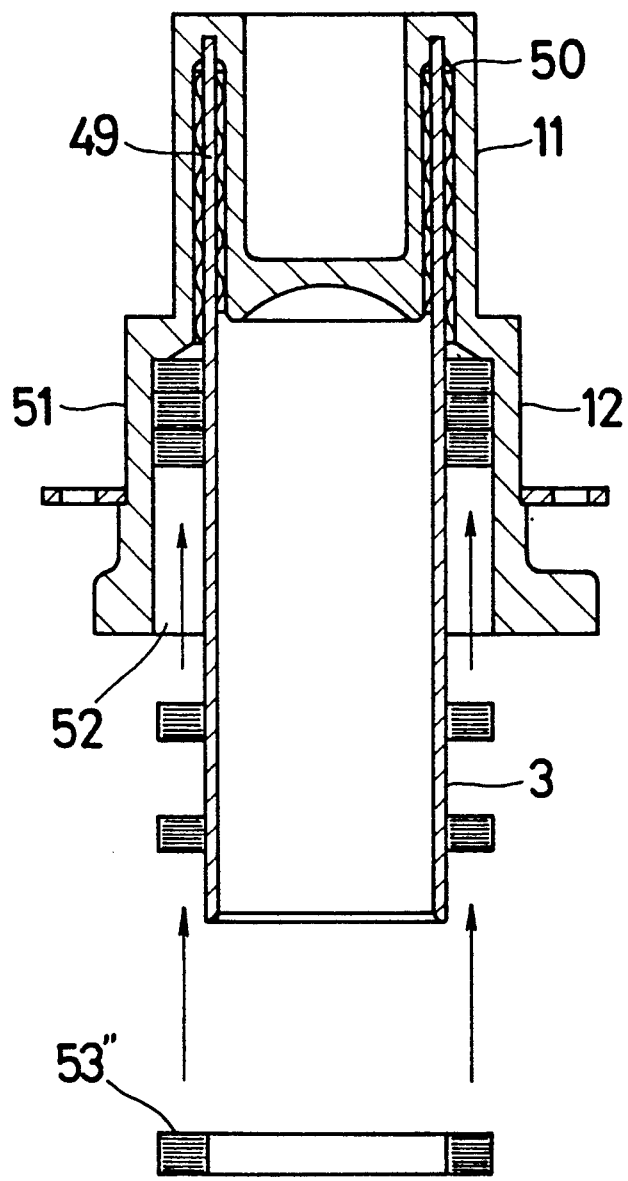

The embodiment shown by FIG. 16b is the embodiment in which preformed metal fiber 53" fills the annular area 52. The pre-formed metal fiber 53" is preformed so as to provide a density capacity of substantially 50% as compared with the density capacity of the unfilled area 52.

Figure 17:
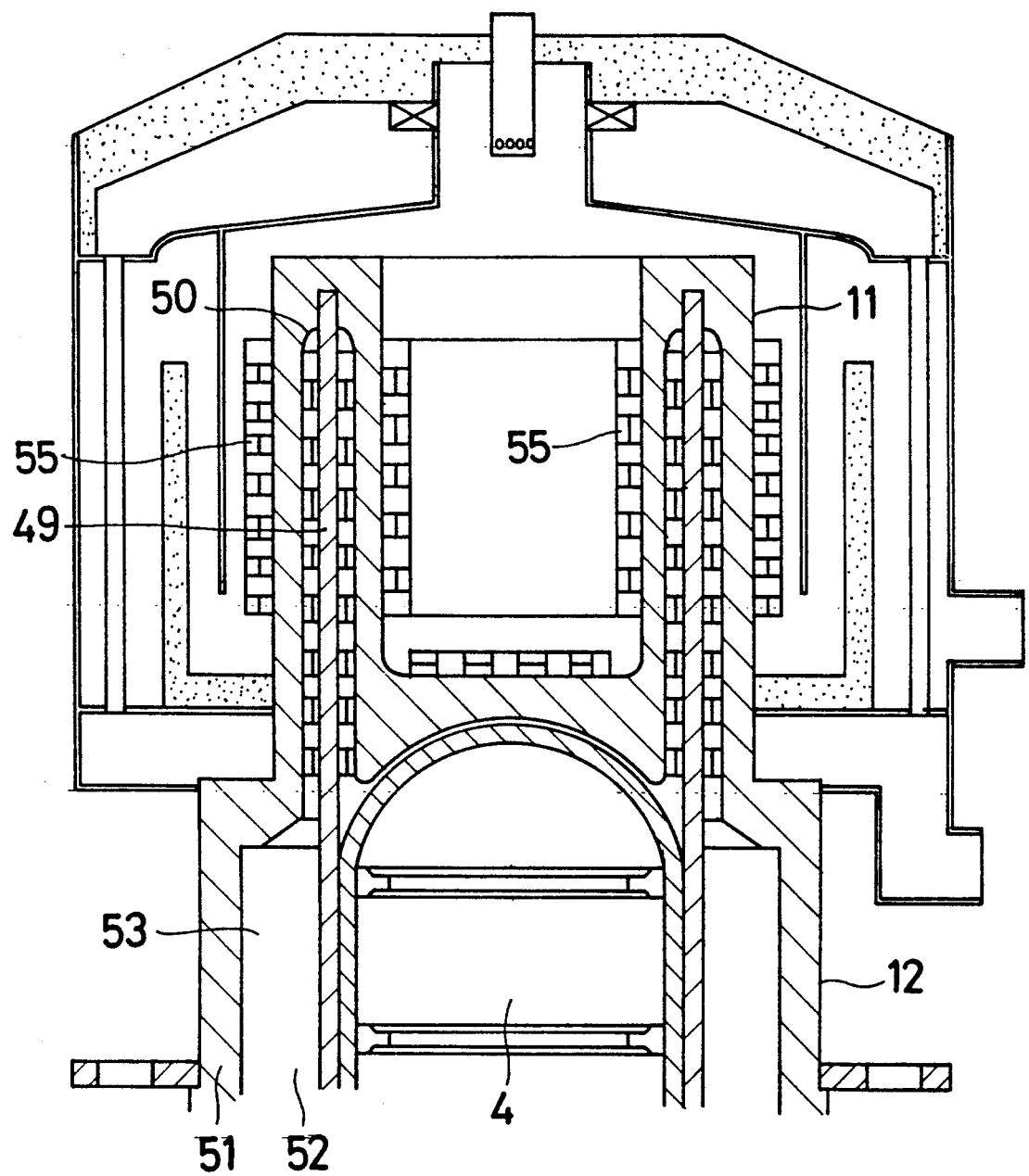
FIG. 17 is a sectional view of a heater part of an embodiment of a Stirling engine in accordance with the present invention.
Figure 18:
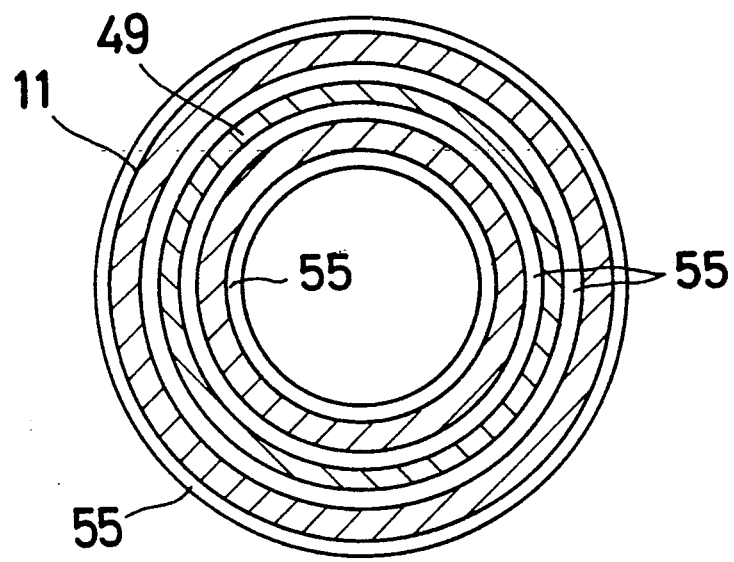
FIG. 18 is a laterally sectional view of the heater shown in FIG. 17.
Figure 19:
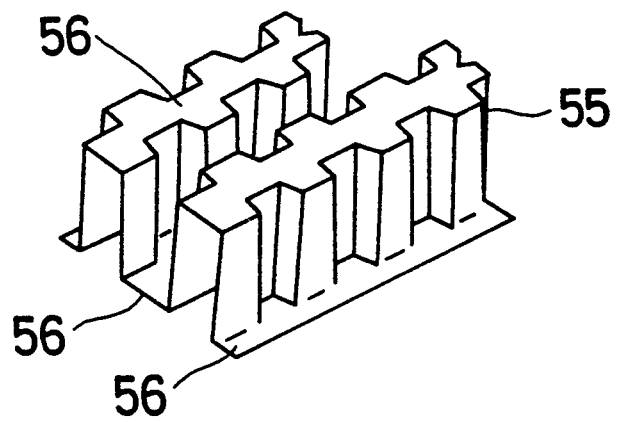
FIG. 19 is a fin of an embodiment of a Stirling engine in accordance with the present invention.

An embodiment in which fins 55 are added to the heater 11 is shown in FIG. 17. In FIG. 17, the fins 55 are disposed along the inner and outer circumferential surfaces of the extension part 49 of the expansion cylinder 3 and are disposed along the inner and outer circumferential surfaces of the cylindrical heater 11. Thereby, the heat transmitting area of the heater 11 is increased. The fin 55 is a multi-step type in which a zigzag unevenness is formed on stainless steel material which is in close contact and continuous, whereby the surface area is increased. The fin 55 is bonded to the extension part 49 and the inner and outer circumferential surfaces of the heater 11 at flat surfaces 56 of the upper and lower sides of the fins 55 (see FIG. 19). Thereby, the operational gas and the combustion gas are flown along the curved passage formed by the unevenness of the fins and transfer the heat. Also, the heater 11 can be reinforced by the fins 55. The fins 55 can be used with the preheater 15 shown in FIG. 1. In such a case, the fins 55 are cylindrically disposed in the cylindrical passage which directs the air for the combustion, and in the cylindrical passage passing the combustion gas.

The buffer chamber 26 is in communication with the crank chamber 25 via passages 56', 57'. The passages 56', 57' are formed at a position difficult for the oil to invade. Thereby, in this embodiment, the contamination of the operational gas is prevented. The oil filter 29 is positioned below the oil level in the crank chamber 25.

Thereby, the oil is easily able to pass the oil filter 29 by the absorptivity of the oil pump 32.

Figure 20:
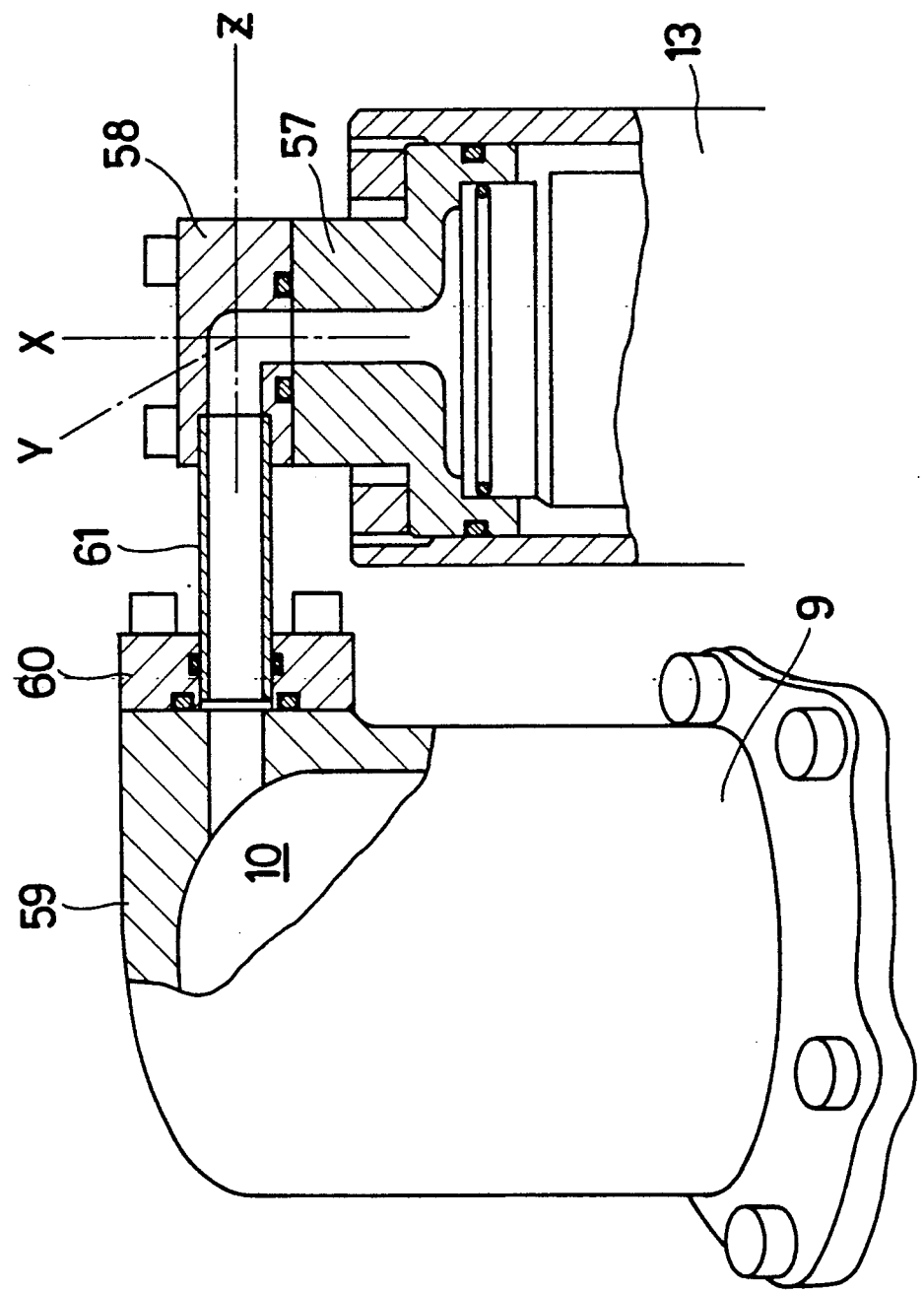
FIG. 20 is a structure for communicating between a cooler and a compression chamber of an embodiment of a Stirling engine in accordance with the present invention.

The operational center of the expansion piston 4 is offset 45 degrees with regard to the operational center of the compression piston 8 as shown by FIG. 1. Therefore, the structure for connecting the compression chamber 10 with the cooler 13 necessitates the three-dimensional arrangement. As shown in FIG. 20, a first flange 58 is fixed to a head 57 of the cooler 13 by bolts via an opening formed in the first flange 58. Thereby, the position can be adjusted in the Y direction. A second flange 60 is fixed to a head 59 of the compression cylinder 9 by bolts via an opening formed in the second flange 60. Thereby, the position can be adjusted in the X direction. The first flange 58 is connected with the second flange 60 via a pipe 61. One end of the pipe 61 is welded in the passage formed in the first flange 58 and the other end of the pipe 61 is slidably fitted into the passage formed in the second flange 60 via an O ring. Therefore, it can be adjusted in the Z direction by the relative movement between the pipe 61 and the second flange 60.

As mentioned above, according to the present invention, since the burner has an annular shape and is disposed in the outside of the lower portion of the regenerator side of the heater, and further since the burner has a plurality of fuel delivery holes and a plurality of air supplying holes which open through an inner circumferential surface, respectively, it is possible to enlarge the opening area of the fuel delivery hole of the burner without spoiling the stabilized combustion. Therefore, it is possible to burn the fuel in a low pressure condition. Accordingly, it is possible to easily use the burner as a power source of the compressor for an air-conditioning and heating device for domestic use.

Furthermore, according to the present invention, since it is possible to easily pre-mix the fuel in the air, a fuel/air mixing device is unnecessary, and a resultant pressure loss is thereby decreased. Therefore, it is possible to use a smaller blower and to reduce the electric power consumption.

Furthermore, since it is possible to make the burner by a variety of material, for example, a metal or a ceramic, it is possible to reduce the manufacturing cost.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed:

1. A Stirling engine, comprising:
   an expansion chamber defined in an expansion cylinder by an expansion piston;
   a compression chamber defined in a compression cylinder by a compression piston and communicating with the expansion chamber via a heater, a regenerator, and a cooler;
   a combustion chamber in proximity to said expansion and compression cylinders;
   a burner located within said combustion chamber, said burner having a substantially annular shape defining an inner circumferential surface and at least one outer surface;

said heater being circularly disposed in the center of said combustion chamber and radially interiorly of said inner circumferential surface of said burner;

an air supply means delivering air to said burner;

a fuel supply means delivering fuel to said burner;

said burner including a plurality of fuel delivery holes receiving fuel from said fuel supply means, and a plurality of air supply holes receiving air from said air supply means, at least one of said pluralities of holes extending from said inner circumferential surface of said burner to an outer surface of said burner.

2. A Stirling engine as recited in claim 1, wherein said burner includes a tapered face on said inner circumferential surface, and said fuel delivery holes include center lines which are at substantially right angles to center lines of said air supplying holes.

3. A Stirling engine as recited in claim 2, wherein said burner includes two parts, and wherein said at least one of said pluralities of holes is formed in a combination face formed by said two parts.

4. A Stirling engine as recited in claim 3, wherein said parts are formed in stepped shapes which together form said combination face, and said at least one plurality of holes is positioned such that said holes are offset from adjacent holes by the stepped shapes forming said combination face.

5. A Stirling engine as recited in claim 1, wherein said fuel delivery holes are connected with said air supplying holes to allow pre-mixing of the fuel in the air.

6. A Stirling engine as recited in claim 5, wherein said burner includes a tapered face on said inner circumferential surface, and said fuel delivery holes include center lines which are at substantially right angles to center lines of said air supplying holes.

7. A Stirling engine as recited in claim 6, wherein said burner includes two parts, and wherein said air supplying holes are formed in a combination face formed by said two parts.

8. A Stirling engine as recited in claim 7, wherein said parts are formed in stepped shapes which together form said combination face, and said air supplying holes are positioned such that they are offset from adjacent air supplying holes by the stepped shapes forming said combination face.

* * * * *